United States Patent [19]

Robinson et al.

[11] Patent Number: 5,204,084
[45] Date of Patent: * Apr. 20, 1993

[54] HYDROMETALLURGICAL PRODUCTION OF ZINC OXIDE FROM ROASTED ZINC CONCENTRATES

[75] Inventors: Murry C. Robinson, Don Mills; Donald H. Eberts, Scarborough, both of Canada

[73] Assignee: Materials-Concepts-Research Limited, Don Mills, Canada

[*] Notice: The portion of the term of this patent subsequent to Jul. 2, 2008 has been disclaimed.

[21] Appl. No.: 721,329

[22] Filed: Jul. 1, 1991

Related U.S. Application Data

[63] Continuation-in-part of Ser. No. 480,374, Feb. 14, 1990, Pat. No. 5,028,410.

[51] Int. Cl.$^5$ ............................... C01G 9/02
[52] U.S. Cl. .................... 423/622; 423/105; 423/109
[58] Field of Search .......... 423/622, 101, 105, 109; 75/103, 115, 120, 654, 725; 210/197

[56] References Cited

U.S. PATENT DOCUMENTS

| | | | |
|---|---|---|---|
| 875,866 | 1/1908 | Sulman | 423/101 |
| 1,204,843 | 11/1916 | Bretherton et al. | 423/105 |
| 2,055,613 | 9/1936 | Sessions | 423/109 |
| 2,603,554 | 7/1952 | Calbeck | 423/622 |
| 2,839,388 | 6/1958 | Van Hare, Jr. et al. | 423/109 |
| 3,523,787 | 8/1970 | Ulrich et al. | 423/105 |
| 3,582,317 | 6/1971 | Gamo et al. | 423/109 |
| 3,753,692 | 8/1973 | Bourchier et al. | 423/106 |
| 4,071,357 | 1/1978 | Peters | 423/622 |
| 4,071,609 | 1/1978 | Robinson | 423/622 |
| 4,118,458 | 10/1978 | Robinson | 423/109 |
| 4,317,803 | 3/1982 | Wilkomirsky et al. | 423/99 |
| 4,689,146 | 8/1987 | Kasai et al. | 210/197 |
| 5,017,346 | 5/1991 | Spink et al. | 423/101 |
| 5,028,410 | 7/1991 | Spink et al. | 423/622 |

FOREIGN PATENT DOCUMENTS

| | | | |
|---|---|---|---|
| 513008 | 5/1976 | U.S.S.R. | 423/622 |
| 228244 | 1/1925 | United Kingdom . | |

Primary Examiner—Michael Lewis
Assistant Examiner—Ngoc-Yen M. Nguyen
Attorney, Agent, or Firm—Bereskin & Parr

[57] ABSTRACT

A process is provided for obtaining high quality high surface area zinc oxide from a roasted zinc sulphide concentrate by leaching with an ammoniacal ammonium carbonate solution. The process utilizes optional preliminary oxidation and water leaching steps to remove soluble impurities and an optional aqueous sulphur dioxide leaching step to selectively remove readily soluble zinc oxide. The process includes an improved source of roasted zinc sulphide concentrate. The process also includes an optional reduced pressure calcining step to produce zinc oxide with further increased surface area.

3 Claims, 1 Drawing Sheet

HYDROMETALLURGICAL PRODUCTION OF ZINC OXIDE FROM ROASTED ZINC CONCENTRATES

This is a Continuation-in-part of U.S. patent application No. 07/480,374 filed Feb. 14, 1990, now U.S. Pat. No. 5,028,410.

FIELD OF THE INVENTION

This invention relates to the production of high quality zinc oxide from roasted zinc sulphide concentrates.

BACKGROUND OF THE INVENTION

By "roasted zinc sulphide concentrates" is meant the product obtained by roasting a zinc sulphide bearing concentrate. The term zinc calcine is also used to refer to such products. Typically, roasted zinc sulphide concentrates contain zinc oxide and other components, including zinc sulphate, zinc sulphide, mixtures of metal oxides such as copper, lead, calcium, cadmium, and magnesium, zinc ferrite, magnetite, possibly some haemetite, and usually some metal silicates, sulphate and sulphides.

Zinc sulphide bearing concentrates are commonly roasted in a fluid bed roaster. In the fluid bed roasting of zinc concentrates, the concentrates are continuously fed into the roaster chamber, wherein air blown up through the chamber converts sulphides to oxides releasing sulphur into the gas stream chiefly as sulphur dioxide, with the development of heat. Smaller and lighter particles in the feed concentrate tend to be carried out of the chamber with the gas stream and are collected by downstream equipment. Larger and heavier particles tend to remain in the roaster fluidized bed through which the moving air is blown. Since the bed is full during continuous operations, a bed overflow stream outlet is provided by which further accumulation of coarse solids is prevented by allowing bed material to overflow out of the chamber. This material is referred to as "bed overflow calcine". In some zinc refineries, calcine is composed of an approximately 50:50 by weight mixture of bed overflow calcine and fine material that is recovered from the gas stream, as described above. This mixture is then used as a feed material in the production of zinc metal and is referred to as normal calcine at least in some cases, such as at the zinc refining from which samples were used in the U.S. Pat. No. 5,028,410 hereafter referred to below.

In accordance with a previous invention, U.S. Pat. No. 5,028,410 aqueous ammoniacal ammonium carbonate solutions are used to selectively leach zinc from roasted zinc sulphide concentrates, leaving a substantial portion of the iron components in the leach residue.

Ammoniacal ammonium carbonate solutions have been suggested for treating zinc scrap and mini-steel plant baghouse dusts to recover zinc oxide. However, it was not previously recognized that such solutions could be used to leach roasted zinc sulphide concentrates, which are dissimilar to zinc scrap and baghouse dust, to produce such high quality, high surface area zinc oxide as are obtained by U.S. Pat. No. 5,028,410. Zinc oxide with the high specific surface area produced by U.S. Pat. No. 5,028,410 can be classed as premium zinc oxide.

A new discovery now reveals that by the use of bed overflow calcine alone, rather than normal calcine as discussed above, a number of improvements result. This is the essence of the present invention.

It is to be noted here that the ratio of bed overflow calcine to dust carryover calcine can vary widely at different zinc refineries. The ratio will not always be approximately 50:50. This would, in no way, detract from the practice of the present invention.

BRIEF SUMMARY OF THE INVENTION

It has now been discovered that by using bed overflow calcine as opposed to normal calcine as feed material to the ammoniacal ammonium carbonate leaching process for normal calcine, a number of very important improvements result, which should result in greater commercial utilization of the process in its improved form, as opposed to the process described in U.S. Pat. No. 5,028,410.

These will be described in the forthcoming section entitled, "Description of the Preferred Embodiment".

Reference is made to U.S. Pat. No. 5,028,410 which is incorporated herein by reference.

DESCRIPTION OF THE PREFERRED EMBODIMENTS

In one embodiment, the bed overflow calcine is fed directly to ammoniacal ammonium carbonate leaching vessels operating continuously under similar conditions as in U.S. Pat. No. 5,028,410.

The slurry leaving the above-described leaching vessels is then fed to a liquid-solid separation vessel as described in U.S. Pat. No. 5,028,410 to separate a pregnant solution containing most of the zinc that was in the calcine from a solid residue containing nearly all of the iron that was in the calcine. The solid residue is returned to the zinc refinery for further treatment or can be treated otherwise according to conventional means.

The pregnant solution is then fed to a cementation step as described in U.S. Pat. No. 5,028,410 for removal of impurities such as cadmium and copper where zinc dust is used for cementation purposes.

A liquid-solid separation step as described in U.S. Pat. No. 5,028,410 is then employed to separate the purified solutions from the solid residue.

The purified solution is then fed to thermal decomposition vessels as described in U.S. Pat. No. 5,028,410 wherein basic zinc carbonate is precipitated and much of the ammonia is stripped off and sent to ammonia recovery equipment, also described in U.S. Pat. No. 5,028,410.

The solid phase containing the basic zinc carbonate is separated from the remaining liquid phase by liquid-solid separation techniques with the liquid phase being recycled to an earlier step in the process.

The basic zinc carbonate solid is then washed to remove entrained impurities and can be marketed as such or fed to a calciner where its carbon dioxide content and water content can be driven off in order to produce zinc oxide.

The calcining step is operated at a temperature between 275° C. and 600° C. to produce an essentially pure, high surface area zinc oxide having a range of 10 to 75 $m^2/g$.

In a second embodiment, the procedure of the first embodiment is followed except that the calcining temperature is operated at a temperature of from 600 to 1000° C. to produce a zinc oxide product that can be made to be essentially equivalent to French Process zinc oxide.

In the third embodiment, both the first and second embodiments would both be used so that both high surface area zinc oxide could be produced to serve certain markets and low surface area zinc oxide could be produced for other markets.

Some of the benefits of the improved invention over the previous invention are described below.

Details of the various improvements are shown in the examples to follow. The improvements apply to both embodiments.

In the first instance, the bed overflow is greatly superior composition to the normal calcine, such as used in U.S. Pat. No. 5,028,410. In addition, if the normal calcine consisted only of roaster dust carryover material, the comparison between the two materials would be substantially greater insofar as to the improvement characteristics of the bed overflow material are concerned. Unfortunately, we do not have any examples yet to compare such differences.

Secondly by using bed overflow calcine as a feed material, downstream processing during continuous operations becomes greatly simplified, particularly in relation to the costs and complexities incurred in the treatment of the recycle liquor returned as a feed material to the ammoniacal ammonium carbonate leaching system.

Thirdly, the leach liquor purification step is simplified by the reduction in cadmium be removed.

Fourthly, the chemical analyses of the intermediate product, namely basic zinc carbonate, and the final zinc oxide product are improved.

Fifthly, there is no desire or need for a prewashing step and subsequent liquid-solid separation step prior to feeding to the ammoniacal ammonium carbonate to leaching vessels.

In the sixth place, the liquid-solid separation step following the ammoniacal ammonium leaching step is improved because, of the larger particles for one thing.

There are other interesting advantages, such as improved water washing steps and other items not specifically mentioned here but will become obvious from a study of the examples.

EXAMPLE 1

Figure 1:
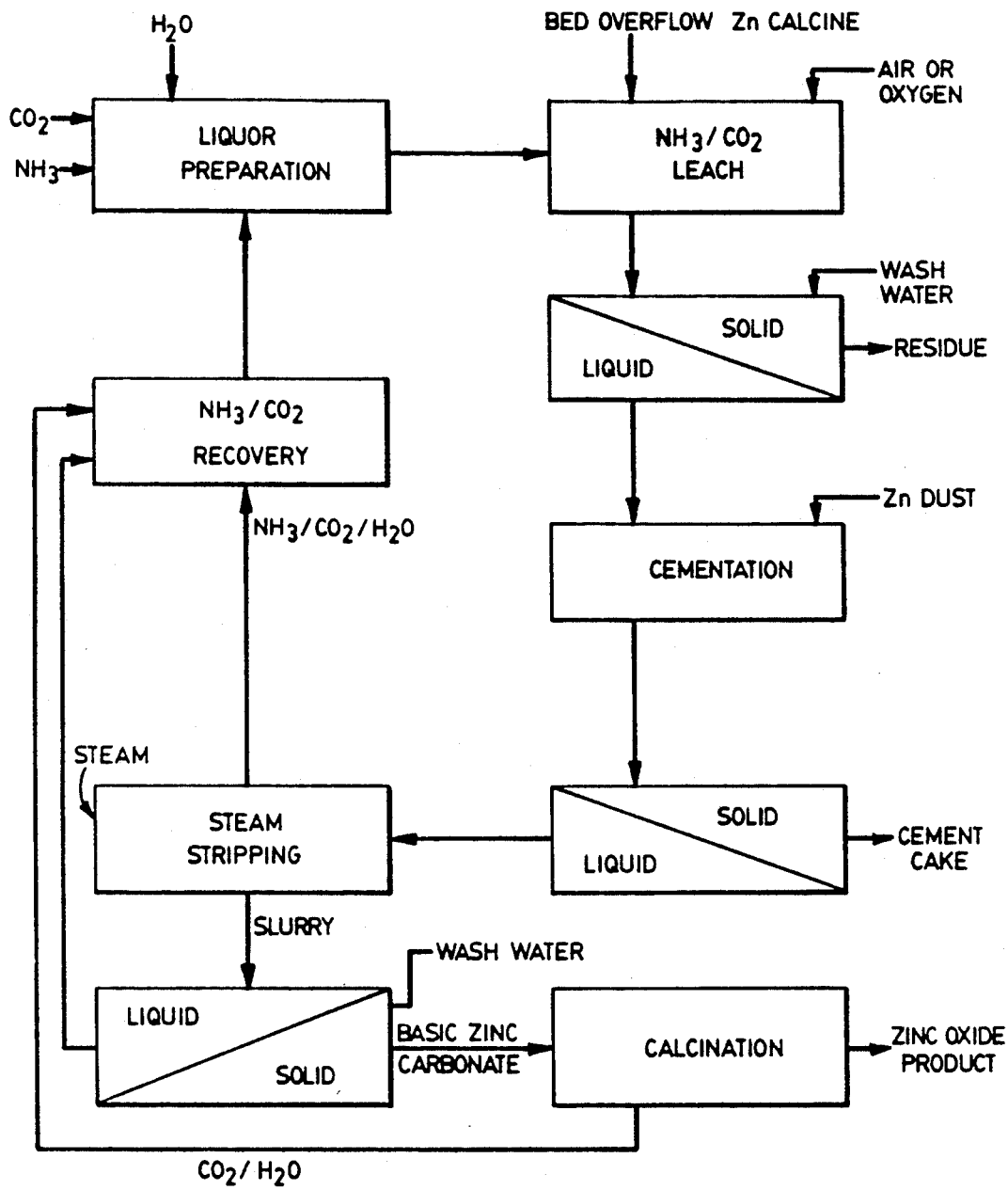
FIG. 1 provides a description of the process in the form of a block diagram.

In this example a specimen of normal zinc calcine and a specimen of bed overflow zinc calcine were obtained and analyzed. The results of the analysis are reported in Table 1. The bed overflow calcine contained lesser amounts of arsenic and sulphur compared to the normal calcine. The bed overflow calcine contained 61.2% extractable zinc, comprising 61.0% in an ammonia-soluble form and 0.2% in a water-soluble form. The normal calcine contained 57.7% extractable zinc, comprising 54.9% in an ammoniasoluble form and 2.8% in a water-soluble form.

A specimen of normal and bed overflow calcine were separately processed in accordance with the process described below.

The calcines were leached in a 28% aqueous ammoniacal ammonium carbonate solution which was prepared by feeding gaseous carbon dioxide into a concentrated ammonium hydroxide solution with vigorous stirring. The final pH of this solution was 11.0. An amount of 450 g of calcine was leached in 1.5 liters of this aqueous ammoniacal ammonium carbonate solution with agitation at a temperature of 50° C. Leaching was conducted for 40 minutes with the occasional addition of gaseous carbon dioxide gas to maintain the pH at approximately 11.0. The resulting slurry was filtered through a filter and the resulting filtrate and residue were analyzed. The assay of the resultant filtrate and residue is reported in Table 2.

A mixture comprising 0.5 l/minute of air and 0.5 l/minute of oxygen was sparged into the leaching vessel. The leach filtrate from the bed overflow calcine contained 0.013 g/l arsenic and 0.22 g/l sulphur, whereas the filtrate from the normal calcine contained 0.052 g/l arsenic and 3.99 g/l sulphur.

The leach filtrate from the bed overflow calcine was then purified by zinc dust cementation for 30 minutes at a solution pH of approximately 11.0 and a solution temperature of approximately 40° C. 8 g/l of fine zinc dust was used to cement out almost all the copper, cadmium, lead and cobalt in the filtrate; arsenic and sulphur were not affected. Analysis of the feed solution, and the cementation residue and filtrate are provided in Table 3.

The purified zinc solution obtained from the zinc dust cementation step after liquid solid separation was steam-stripped by injecting live steam into the purified zinc solution until most of the ammonia was expelled and basic zinc carbonate precipitated, approximately. Analyses of the purified zinc solution, the resulting precipitate, and the depleted solution are reported in Table 4. The pH of the final solution was reduced to between approximately 8 to 8.5.

In this particular example, it is obvious that the bed overflow calcine was of superior quality to normal calcine in that the extractable zinc is substantially higher, 61.2% versus 57.7%. Also the total zinc is higher 67.0% versus 63.7%.

The cadmium content of the bed overflow calcine is very much lower than the normal calcine, thus resulting in simpler leach liquor purification.

The particle size of the bed overflow is much larger, thus resulting in easier liquid-solid separation.

The zinc sulphate content of the bed overflow is essentially negligible as compared to that of normal calcine thus indicating a much simpler and less costly recycle system for the improved process.

It is also obvious in this example that there is no need for a pre-water-washing step and consequent liquid-solvent separation since this step is sometimes desirable to remove sulphates and it can be seen that the sulphate content of the bed overflow material is so low that such a washing step would not be either desirable or necessary.

EXAMPLE 2

In this example a specimen of normal zinc calcine and a specimen of bed overflow calcine were treated in general accordance with the process disclosed in Example 1 above.

The basic zinc carbonate was then calcined at 1,000° C. Analysis of the resulting calcine is presented in Table 5.

It is apparent from Example 2 that bed overflow calcine produces a higher purity zinc oxide as compared to normal calcine with respect to the following elements:

|  | Bed Overflow Calcine (wt %) | Normal Calcine (wt %) |
|---|---|---|
| Arsenic | 0.006 | 0.024 |
| Sulphur | 0.004 | 0.02 |
| Cadmium | <0.0005 | <0.00004 |
| Iron | 0.003 | 0.0059 |
| Silicon | <0.001 | 0.016 |

TABLE 1
CALCINE ANALYSIS

| Element Weight % | Normal Calcine Weight % | Bed Overflow Calcine Weight % |
|---|---|---|
| Zn | 63.7 | 67.0 |
| Cu | 0.85 | 0.92 |
| Cd | 0.33 | 0.14 |
| Co | 0.02 | 0.017 |
| Fe | 10.1 | 9.31 |
| Pb | 0.05 | 0.022 |
| Ca | 0.22 | 0.12 |
| Mg | 0.063 | 0.068 |
| Si | 0.55 | 0.01 |
| As | 0.04 | 0.015 |
| Cl | 0.002 | 0.005 |
| S | 1.8 | 0.14 |
| Mn | 0.02 | 0.01 |

| Zinc Components | Normal Calcine wt % Zn | Bed Overflow Calcine wt % Zn |
|---|---|---|
| Zn SO$_4$ (water soluble) | 2.8 | 0.2 |
| Zn O (ammonia soluble) | 54.9 | 61.0 |
| Zn SiO$_2$ (acetic acid soluble) | 1.8 | 2.1 |
| Zn Fe$_2$O$_4$ (H$_3$PO$_4$/HCL soluble) | 4.4 | 4.2 |
| Total | 63.9 | 67.5 |

| Size Analysis | Normal Calcine wt % Passing | Bed Overflow Calcine wt % Passing |
|---|---|---|
| 100 Mesh | 94.4 | 52.4 |
| 200 Mesh | 87.3 | 28.7 |
| 400 Mesh | 68.0 | 2.6 |

TABLE 2

| | Normal Calcine | | Bed Overflow Calcine | |
|---|---|---|---|---|
| Element | Filtrate g/l | Residue wt % | Filtrate g/l | Residue wt % |
| Zn | 150 | 29.5 | 185 | 30.5 |
| Cu | 1.58 | 1.01 | 1.58 | 1.53 |
| Cd | 0.48 | 80.2 | 0.27 | 0.17 |
| Co | 0.017 | 0.027 | 0.022 | 0.023 |
| Fe | 0.008 | 35.2 | 0.035 | 35.5 |
| Pb | 0.009 | 0.14 | 0.011 | 0.064 |
| Ca | 0.026 | 0.45 | 0.048 | 0.37 |
| Mg | 0.033 | 0.15 | 0.055 | 0.18 |
| Si | 0.01 | 1.03 | 0.012 | 1.06 |
| As | 0.052 | 0.085 | 0.013 | 0.043 |
| Cl | 0.03 | — | 0.035 | 0.005 |
| S | 3.99 | 0.25 | 0.22 | 0.05 |
| Mn | <0.0002 | 0.03 | 0.0003 | 0.038 |

TABLE 3
CEMENTATION OF BED OVERFLOW CALCINE LEACH LIQUOR

| Element | Leach Liquor Feed Solution g/l | Filtrate g/l | Residue wt % |
|---|---|---|---|
| Zn | 185 | 190 | 65.6 |
| Cu | 1.58 | 0.0002 | 26.7 |
| Cd | 0.27 | 0.001 | 5.29 |
| Co | 0.022 | 0.0004 | 0.42 |
| Fe | 0.035 | 0.014 | 0.37 |
| Pb | 0.011 | 0.0008 | 0.25 |
| Ca | 0.048 | 0.051 | 0.005 |
| Mg | 0.055 | 0.061 | 0.009 |
| Si | 0.012 | 0.017 | 0.06 |
| As | 0.013 | 0.009 | 0.017 |
| Cl | 0.035 | 0.044 | 0.005 |
| S | 0.22 | 0.29 | 0.014 |
| Mn | 0.0003 | 0.0003 | 0.0 |

TABLE 4
STEAM STRIPPING

| Element | Feed Solution g/l | Final Solution g/l | Precipitate wt % |
|---|---|---|---|
| Zn | 190 | 0.005 | 60.0 |
| Cu | 0.0002 | 0.0002 | 0.005 |
| Cd | 0.001 | 0.0002 | 0.004 |
| Co | 0.0004 | 0.0003 | 0.003 |
| Fe | 0.014 | 0.0003 | 0.013 |
| Pb | 0.0008 | 0.001 | 0.011 |
| Ca | 0.051 | 0.002 | 0.023 |
| Mg | 0.061 | 0.0002 | 0.025 |
| Si | 0.017 | 0.003 | 0.05 |
| As | 0.009 | 0.001 | 0.014 |
| Cl | 0.044 | 0.036 | 0.005 |
| S | 0.29 | 0.081 | 0.09 |
| Mn | 0.0003 | 0.0001 | 0.0009 |
| NH$_3$ | 190 | 0.46 | 0.24 |
| Amount | 0.875 L | 1.139 L | 251.57 g |

The amount of feed solution used was 0.875 l, the final solution amounted to 1.139 l, and the dried precipitate weighted 251.57 g.

TABLE 5

| Element | Normal Calcine Wt % | Bed Overflow Calcine Wt % |
|---|---|---|
| Zn | 81.5 | 81.2 |
| Cu | 0.0019 | 0.001 |
| Cd | <0.0005 | <0.00004 |
| Co | <0.0005 | 0.001 |
| Fe | 0.0059 | 0.003 |
| Pb | <0.0005 | 0.0006 |
| Ca | 0.021 | 0.031 |
| Mg | 0.022 | 0.026 |
| Si | 0.016 | <0.001 |
| As | 0.024 | 0.006 |
| Cl | <0.004 | <0.004 |
| S | 0.02 | 0.004 |
| Mn | <0.0002 | 0.0001 |
| NH$_3$ | <0.0006 | 0.046 |
| Li | 0.00003 | 0.00004 |
| Al | 0.002 | 0.002 |

We claim:
1. A process for the production of zinc oxide comprising the steps of:
(a) roasting zinc sulphide bearing concentrates containing arsenic, sulfur and cadmium compounds in a fluid bed roaster wherein both dust carry over calcine and bed overflow calcine are produced; selecting the bed overflow calcine which contains lesser amount of arsenic, sulfur and cadmium compounds than a normal calcine of combined dust carry over calcine and bed overflow calcine for further processing;

(b) slurrying a roasted zinc sulphide concentrate consisting only of bed overflow calcine in an aqueous solution of ammoniacal ammonium carbonate solution to dissolve zinc contained therein without washing;

(c) separating a zinc bearing leach liquor from the leach slurry;

(d) purifying the zinc bearing leach liquor by cementation to remove at least one of the metals of copper and cadmium, prior to the step of steam stripping the purified zinc bearing leach liquor.

(e) steam stripping the purified zinc bearing leach liquor to remove ammonia and to precipitate basic zinc carbonate; and (f) separating the precipitated basic zinc carbonate and calcining the basic zinc carbonate to produce zinc oxide at a temperature in the range of 275° C. to 1,000° C.

2. A process as claimed in claim 1 wherein the calcining temperature is in the range of 275° C. to 600° C. in order to produce high surface area zinc oxide in a range of 10 $m^2/g$ to 75 $m^2/g$ 3. A process a claimed in claim 1 wherein the calcining temperature is in the range of 600° C. to 1,000° C. in order to produce zinc oxide near or equivalent to French process zinc oxide.

* * * * *